Figure 1:
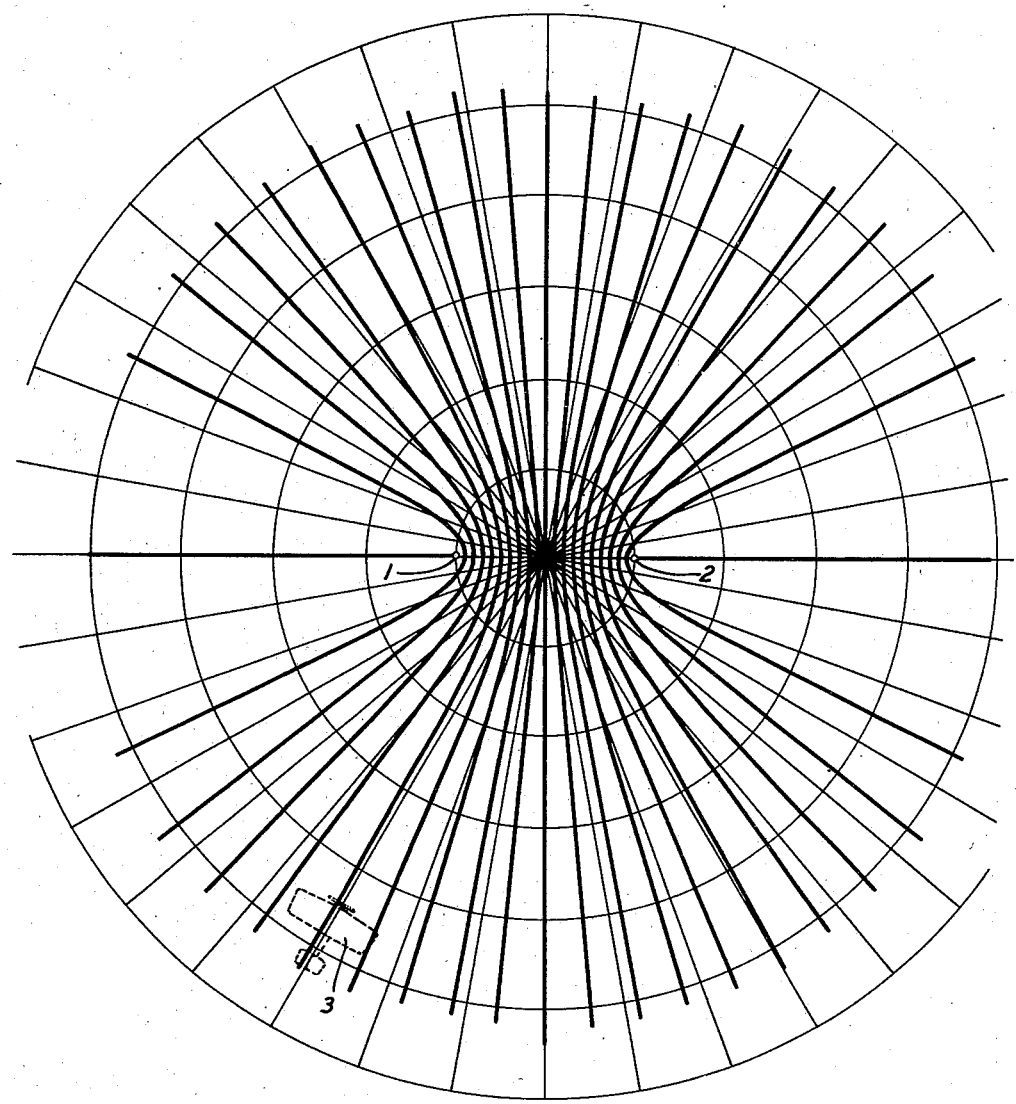

April 23, 1935.    C. R. ENGLUND    1,998,834
RADIO GUIDING SYSTEM
Filed Nov. 19, 1931    2 Sheets-Sheet 2

INVENTOR
C. R. ENGLUND
BY Guy T. Morris
ATTORNEY

Patented Apr. 23, 1935

1,998,834

UNITED STATES PATENT OFFICE 1,998,834

RADIO GUIDING SYSTEM

Carl R. Englund, Freehold, N. J., assignor to Bell Telephone Laboratories, Incorporated, New York, N. Y., a corporation of New York Application November 19, 1931, Serial No. 575,988

2 Claims. (Cl. 250—11)

This invention relates to the art of direction finding and more particularly to methods and means for enabling a wave receiving station to direct a course with respect to the position of a source of the received waves. Although not so limited in practice the invention perhaps attains its greatest effectiveness as a navigation aid for aircraft and, as so used, when employing ether waves for the guiding medium.

It is an object of the invention to more effectively determine a course for a mobile wave receiving station with respect to a given wave transmitting station than by prior known methods or means.

A more specific object is to more effectively plot a course for an aircraft, or other object which moves relatively rapidly in a medium which affords little opportunity for contacts with its surroundings which might otherwise be utilized for direction or position finding.

A still more specific object is to achieve radio direction finding by methods and means which excel in simplicity and economy of time and material, which is not dependent on directional characteristics of transmitter or receiver or on instantaneous phase relations, and which is independent of field distortion which metal airplane parts, for example, tend to produce in wave reception especially where short waves are used; all such characteristics being desirable in a direction finding method or system and the absence of which has to a considerable extent handicapped the development of the art to which the invention pertains.

The invention utilizes a phenomenon identified in physics by the term "Doppler principle" by virtue of which a wave receiver, the position of which is changing with respect to a source of the waves received, experiences an apparent change of frequency of incident waves with change of relative velocity, an increase when the receiver and transmitter are becoming relatively closer and a decrease when becoming relatively further apart. The phenomenon is, of course, due to the fact that the rate of interception of the radiated wave, which determines the apparent frequency, is a function not only of the velocity and spacing of the waves in the ether but also of the relative movements of the transmitter and receiver.

The use of the above principle in its simplest conception would enable a receiver to plot a desired course with respect to a transmitter (or, broadly, a desired relative movement of the two) since the increase or decrease of the apparent frequency, which may be translated into an audible tone, is a measure of the accuracy with which the course of the receiver is directed toward or away from the transmitter. However, the invention, in a preferred embodiment, makes use of a relation between the apparent frequencies at a common receiver with respect to two relatively fixed transmitters, preferably adapted to transmit waves of the same frequency, and particularly of observations on their beat frequency. It has been found that a course from any point in space plotted in such manner as to maintain a minimum beat frequency (zero beat if the frequencies of the transmitted waves are the same) will point almost directly at a spot halfway between the two transmitters. It is feasible especially by the use of relatively short waves to employ a spacing between the relatively fixed transmitters small enough, say a few wave lengths, to permit their easy joint operation and frequency control and, with respect to a receiver at a distance from the two transmitters as a unit greater than their own spacing and, therefore, for example, at any distance outside the range of direct vision, small enough to cause the combination to simulate, for all practical purposes, a point source toward which it is desired to direct the receiver.

Figure 2:
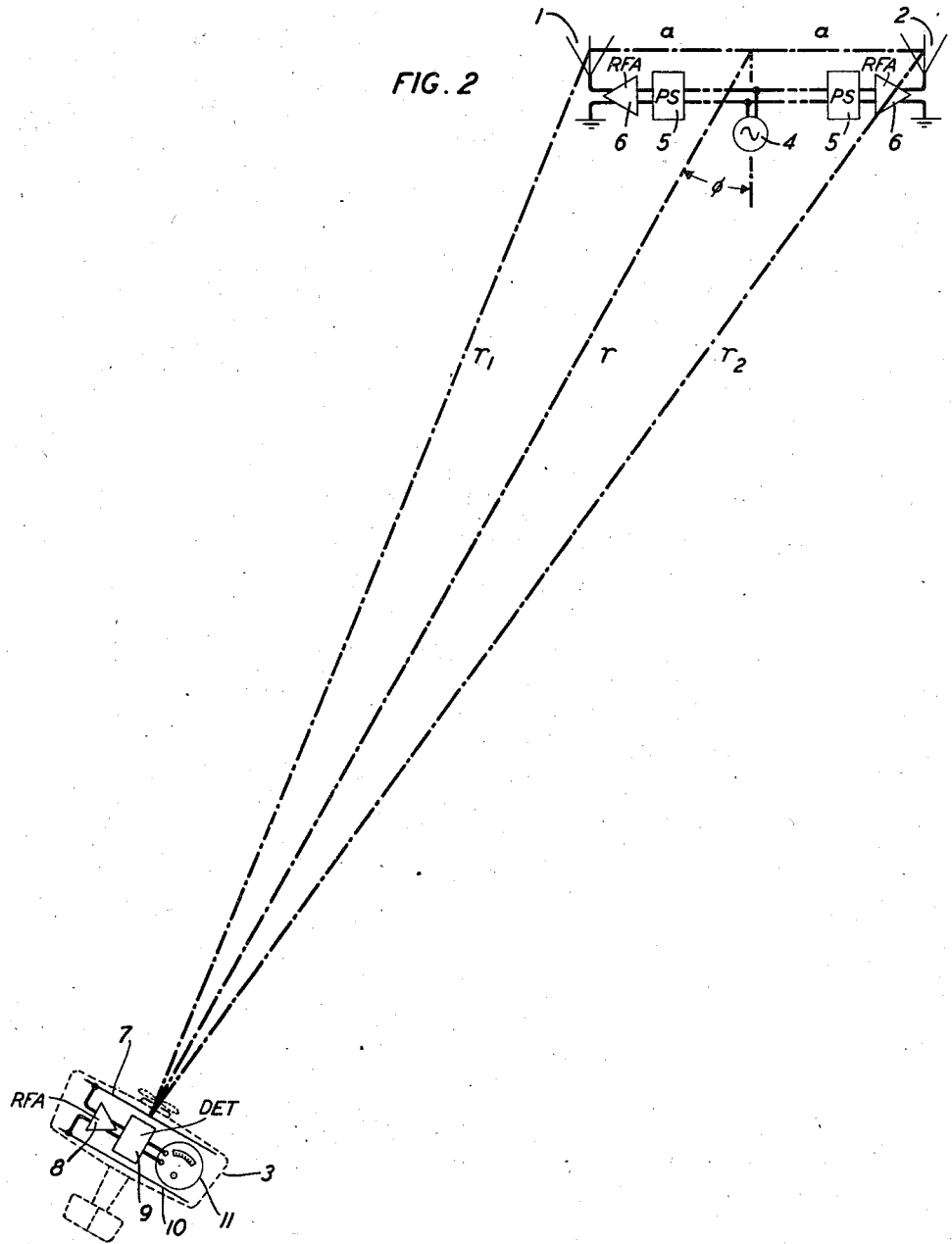

A more detailed description of the invention follows, being illustrated in the accompanying drawings in which:

Fig. 1 comprises a family of curves each representing a course for a mobile receiver corresponding to which there is a zero beat between the waves incident from the two transmitting stations; and Fig. 2 is a diagrammatic representation of an organization by means of which the invention may be practised comprising also the graphical symbolism used in the mathematical analysis of the operation of the invention.

The invention relates to an application of the "Doppler" principle in direction finding or in guidance by means of waves. By reason of the operation of the "Doppler" principle, a receiving station whose position is being changed relatively to that of a source of waves will appear to be receiving waves having a frequency greater or less than the frequency of the source, depending on whether the receiver is approaching or going away from the source, this change of frequency being a function of the relative velocities of the transmitting and receiving stations.

In the present invention, use is made of a relation between two frequencies, each varying as in accordance with the operation of the "Doppler" principle as above, therefore contemplating the use of two transmitting stations. In the operation of the invention or in accordance with one practical aspect, a radio receiving station (it might be an airplane station) approaches or recedes from two radio transmitting stations positioned within perhaps a mile or so from each other, that is, a distance small as compared with the distance from the two stations as a unit to the receiver, and transmitting waves of fixed and preferably the same frequency, the frequencies being controlled very accurately. The two "Doppler" frequencies are combined at the receiver to achieve a beat note, the direction of movement of the receiver being judged by the change of the beat note frequency.

The following brief analysis will provide a quantitative basis for the application of the principle of the invention.

Assume that the two transmitting stations are located on a base line of length $2a$ and let it be assumed that there is transmitted simultaneously from each of these stations an unmodulated high frequency wave. It is assumed for purposes of analysis that the transmitted frequencies are the same. If they are different the analysis and operation, as hereinafter to be described, is in general applicable with obvious variations. When the two radiated waves are of exactly the same frequency, the radio receiver, moving in such a manner with respect to these two transmitting stations as to approach one at a more rapid rate than the other, will have a beat frequency produced in it which may be calculated in the following manner:

The radio frequency being $f$ and the rate at which the distance between a transmitter and the moving receiver is decreasing being $$\frac{dr}{dt},$$

we have for the apparent frequency of a transmitter $$f + \frac{1}{\lambda}\frac{dr}{dt}$$

where $\lambda$=wave length and when two transmitters are simultaneously radiating waves of frequency $f$, which waves are also simultaneously received and detected, we have a component of detected current produced which is of the frequency $$\frac{1}{\lambda}\left(\frac{dr_2}{dt}-\frac{dr_1}{dt}\right)$$

$r_2$ and $r_1$ representing the distance of the common receiver from the respective transmitters.

Ordinarily this frequency, that is the beat frequency between the two incident waves at the receiver, would be too low to be of use, but by choosing the wave length short enough it can be stepped up at will. Thus for an airplane moving at a velocity of 100 miles per hour and with the wave length being assumed to be 5 meters, if the difference of the two radial velocities, that is, the quantity in brackets in the above expression is one-tenth of the airplane velocity, there results a beat frequency of $$\frac{4.47}{5}=0.894$$

cycles per second. For ready observation this should be increased by at least a factor of four and there is no doubt that the velocity difference of one-tenth is low rather than high and five meters not the shortest wave length possible, so that an adequate stepping up can be achieved.

Probably the best means for visualizing the performance of such a system is to plot on a map of such system a series of zero beat frequency curves, that is the curves which respond to the condition that $$\frac{dr_2}{dt}-\frac{dr_1}{dt}=0.$$

Fig. 1 represents a family of such curves, the reference numerals 1 and 2 indicating the positions of the two transmitters or specifically the positions of the transmitting antennas and the airplane 3 indicating the position of the mobile receiver. In this figure, the spacing $2a$ between the transmitting antennas is chosen to equal 20 wave lengths of the significant waves and each line is drawn so as to represent a zero "Doppler" frequency difference, and in passing from one line to a next adjacent line, one of the received "Doppler" frequencies will gain 1 cycle over the other. If the frequency is assumed to be increased by 10, keeping the system otherwise unchanged, the lines will be 10 cycles apart. Obviously motion along any one of the lines is accompanied by a zero beat frequency response in the airplane receiver-indicator and motion perpendicular to any one of the lines is accompanied by the maximum possible beat frequency for the given location. Increasing the transmitting antenna spacing for a given wave length will multiply the density of zero frequency lines, at a given "$r$" compared to which the antenna spacing is relatively small by the ratio of the new spacing to the old spacing.

It is notable that at distances from the two transmitting stations, as a unit, which is great as compared with the spacing of the two transmitting stations, the zero frequency lines (isofrequency lines) point almost exactly at the physical center of the transmitting stations taken as a unit. As an ideal case, which may be easily approached in practice, the wave length may be made sufficiently short to permit such a spacing of transmitting stations as will cause them, at distances from the receiver beyond the limit of visual perception, to simulate a point toward which the lines point and toward which the airplane, or other mobile receiver, may be guided up to the point where visual perception may take the place of radio beam guidance.

Alternatively to the type of analysis used above to predetermine the form of the curves, the equation of each of the curves may be taken to be $r_2-r_1=K$ where $K$ is a constant. This equation is obviously correct since it may be expressed, in a differential form, as the equation above given which was used to express the fact of a zero beat between the two "Doppler" frequencies. This relation $r_2-r_1=K$ may be used, in a very simple manner, to determine the equation for the curves in terms of a single variable $r$ which represents the distance from the receiver to a point midway between the two transmitters and therefore distant from each transmitter by the length $a$. In the derivation of this version of the equation for the curves, reference may be had to Fig. 2 which shows the quantities appearing in the analysis.

The problem is, then, to find the equation of a family of curves where $r_2-r_1=K$. Of course each of these curves represents a hyperbola. The maximum value of $K$ possible is $2a$ and we may write $r_2-r_1=2\alpha a$, where $\alpha$ has a value between zero and one.

Consistently with the geometry of the figure, the following two equations may be written:

$$r_2^2 = a^2 + r^2 - 2ar \cos\left(\frac{\pi}{2} + \varphi\right) = a^2 + r^2 + 2ar \sin \varphi$$

and $$r_1^2 = a^2 + r^2 - 2ar \cos\left(\frac{\pi}{2} - \varphi\right) = a^2 + r^2 - 2ar \sin \varphi$$

These equations may be resolved into the following equations:

$$r_2^2 - r_1^2 = 4ar \sin \varphi$$

and $$r_2 - r_1 = \frac{4ar \sin \varphi}{r_2 + r_1} = 2\alpha a$$

or $$2\alpha a = \frac{4ar \sin \varphi}{\sqrt{a^2 + r^2 + 2ar \sin \varphi} + \sqrt{a^2 + r^2 - 2ar \sin \varphi}}$$

Rationalization of the last equation gives the equation:

$$r = \alpha a \sqrt{\frac{1 - \alpha^2}{\sin^2 \varphi - \alpha^2}}$$

or, expressed in polar coordinates, $$\sin \varphi = \alpha \frac{\sqrt{a^2(1 - \alpha^2) + r^2}}{r}$$

Fig. 2 besides showing the geometrical relations in the system as used in the mathematical analysis, shows also the electrical structure of the system in a diagrammatic form although in a form sufficiently explicit to enable one to practice the invention since the elements of the system are, or may be, perfectly conventional.

As in Fig. 1, the reference numerals 1, 2 and 3 represent the transmitting antennas and the mobile receiving station. The waves of frequency $f$ are radiated from antennas 1 and 2, being derived from carrier frequency source 4 which is connected to such antennas through phase shifters 5 and radio frequency amplifiers 6. The phase shifters are useful to insure that the two waves radiated are exactly alike, that is alike not only with respect to frequency, but also with respect to phase, a necessary condition for the effective operation of the invention. On occasion, of course, these elements may be omitted, that is, when, for example, the source is located in the line between the antennas and at equal distances from them. Similarly on occasion the radio frequency amplifiers may also be omitted, their use depending merely on the desired amplitude level of the received waves.

The circuits at the receiver 3 comprise the usual combination of receiving antenna, radio frequency amplifier and detector, these elements being represented respectively by reference numerals 7, 8 and 9, the antenna ground being simulated by the counterpoise 10. The indicator 11 in the output circuit of the detector may be any device capable of frequency indication and adaptable to respond to frequencies of relatively low order since, in the normal operation of the invention, the frequencies concerned will vary slightly only around the zero point.

In the operation of the invention the mobile receiver, such as the receiver on an airplane, is merely guided in such a direction as is necessary to preserve equality of "Doppler" frequencies at the receiver and therefore so as to give a continuous zero beat frequency in the indicating instrument at the receiver. The path of the receiver will coincide with the particular one of the family of curves shown in Fig. 1 which passes through the instantaneous position of the receiver at the beginning of the guided movement. This means gives adequate guidance of the receiver, that is of the airplane, with reference to the midpoint of the transmitting system, and therefore for practical purposes with reference to either transmitter, within a range of movement during which such radio guidance is essential and corresponding to which the transmission system has relatively small dimensions.

It is presumed that considerations not related to the invention will determine which of the two opposite directions, each satisfying the condition, is the one to be followed, so that ambiguity on that account may be avoided. For instance, the progress of a plane toward the transmission system would probably be marked by a measurable increase in the level of reception. A perhaps more obvious expedient would be to indicate the "Doppler" frequency with respect to either transmitter and note whether the frequency is increasing or decreasing with the progress of the airplane.

Although the invention has been described as a radio direction finding or guiding system, the principle inherent in the invention is applicable to direction finding or guiding methods using other types of waves. For example, the principle may be used with sound waves in the navigation of a ship through fog. Since it is a relative motion of receiver and transmitter which is significant, the invention could be practiced to direct a mobile transmitter to a fixed receiver. In certain practical cases, perhaps where sound waves are used, the two transmitters could be sufficiently spaced on various types of moving bodies to make operation in this manner effective.

What is claimed is:

1. A method of directing the movements of a mobile receiving station toward a point which is substantially midway between two fixed transmitting stations, which comprises transmitting waves of fixed frequency characteristics from said transmitting stations, receiving and combining said waves at the mobile receiving station to produce a wave which represents the difference between the two Doppler frequencies corresponding to the two transmitted waves, indicating the frequency of said difference frequency wave, and guiding the receiving station along such a path as will maintain such difference frequency at its minimum value, the frequencies of said waves being sufficiently high that, with the given velocity of movement of said mobile station and with a spacing of said transmitting stations, which is small as compared with the horizon distance between said transmitting stations as a unit and the receiving station, the Doppler frequency at said receiving station with respect to each transmitted wave tends to vary to a measurable degree, with a corresponding variation of beat frequency, if the receiving station departs substantially from the path as so determined.

2. The method defined by claim 1 in which the frequencies of the two waves transmitted are equal.

CARL R. ENGLUND.